(12) United States Patent
Bae et al.

(10) Patent No.: US 6,667,563 B2
(45) Date of Patent: Dec. 23, 2003

(54) TOUCH SWITCHING APPARATUS

(75) Inventors: Mun Sik Bae, Daegu (KR); Seog Yeong Jeong, Kumi (KR)

(73) Assignee: LG Electronics Inc, Seoul (KR)

( * ) Notice: Subject to any disclaimer, the term of this patent is extended or adjusted under 35 U.S.C. 154(b) by 156 days.

(21) Appl. No.: 09/870,519

(22) Filed: Jun. 1, 2001

(65) Prior Publication Data

US 2001/0048247 A1 Dec. 6, 2001

(30) Foreign Application Priority Data

Jun. 1, 2000 (KR) ........................................ 2000-30113

(51) Int. Cl.[7] .............................................. H01H 35/00
(52) U.S. Cl. ...................... 307/112; 200/600; 361/271; 361/288; 345/168
(58) Field of Search ...................... 307/112; 200/600; 361/288, 271; 345/168

(56) References Cited

U.S. PATENT DOCUMENTS

| | | | | |
|---|---|---|---|---|
| 3,701,869 A | * | 10/1972 | Jacob et al. | 200/167 R |
| 4,262,182 A | * | 4/1981 | Basler et al. | 200/314 |
| 4,377,049 A | * | 3/1983 | Simon et al. | 40/465 |
| 4,380,040 A | * | 4/1983 | Posset | 361/280 |
| 4,532,395 A | * | 7/1985 | Zukowski | 200/314 |
| 5,465,091 A | * | 11/1995 | Nishino et al. | 341/33 |
| 5,867,111 A | * | 2/1999 | Caldwell et al. | 341/33 |
| 6,225,711 B1 | * | 5/2001 | Gupta et al. | 307/125 |

FOREIGN PATENT DOCUMENTS

JP          57057428     *   4/1982    ..........  H01H/36/00

* cited by examiner

*Primary Examiner*—Brian Sircus
*Assistant Examiner*—Robert L. DeBeradinis
(74) *Attorney, Agent, or Firm*—Fleshner & Kim, LLP

(57) ABSTRACT

A touch switching apparatus includes: a switching unit for evenly illuminating on a touch unit manipulated by a user among touch units with marks; and a driving circuit for driving the switching unit when detecting the manipulation. The touch switching apparatus includes: an insulating unit for inducing a capacitance as a user's body contacts and presented with a touch switch for manipulation of an instrument; a conductive unit for detecting a capacitance through the medium (dielectric) of a user's body contacting the insulating unit; a flat light emitting device for providing a backlight to the insulating unit to visibly express a corresponding switching unit when a body contact is detected by the conductive unit; and a drive unit for detecting whether a switch has been manipulated according to a change in a capacitance made by the conductive unit.

25 Claims, 5 Drawing Sheets

FIG. 5A  Pin
FIG. 5B  Pb
FIG. 5C  Pout
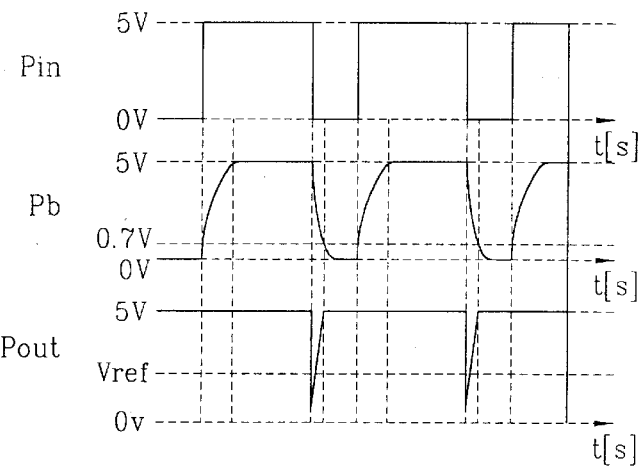
FIG. 6
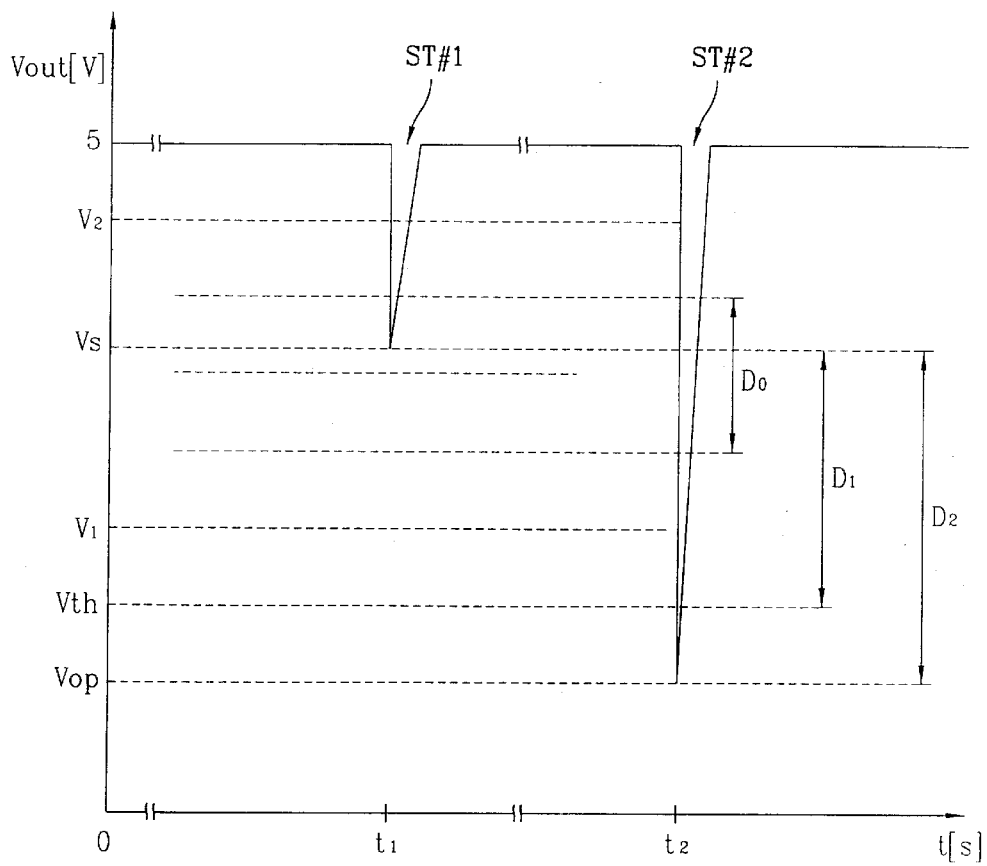

TOUCH SWITCHING APPARATUS

BACKGROUND OF THE INVENTION

1. Field of the Invention

The present invention relates to a touch switching apparatus, and more particularly, to a touch switching apparatus for clearly displaying a mark drawn on a touch unit when a user operates it by using a flat light emitting device as a backlight.

2. Description of the Background Art

Recently, in order to facilitate manipulation of electronic, electric or information instrument such as a TV receiver or a VCR and so forth, a touch switching apparatus is increasingly adopted to be installed in an operating panel of the instruments.

The touch switching apparatus performs ON/OFF operation when a part of the user's body (i.e., fingers, etc.) contacts a touch unit and an electric charge accumulated in the body is inputted via the touch unit thereto. At this time, in order to indicate an operation state of the touch switching apparatus, a backlight is used inside the touch unit.

FIG. 1 is a sectional view of the touch switching apparatus using a light emitting diode (LED) as a backlight in accordance with a conventional art.

As shown in FIG. 1, the conventional touch switching apparatus includes a glass plate 1 being contacted by a body part of a user for manipulation; a touch unit (TS) arranged at predetermined positions of the glass plate 1; a conductive silver-plated film 3 partially plated with silver on the inner surface of the glass plate 1 or the opposite face of the touch pat (TS) corresponding to the touch unit (TS); a printed circuit board (PCB) 2 installed spaced apart from the glass plate 1; a conductive rubber 4 installed at the PCB 2 corresponding to the silver-plated film 3 of the glass plate 1; a pin plug 5 fixing the conductive rubber 4 to the PCB 2; and a light emitting diode (LED) 6 installed at the PCB 2 for emitting light when the silver-plated film 3 and the conductive rubber 4 are connected to each other as the user contacts the touch unit (TS).

The operation of the conventional touch switching apparatus using the LED as a backlight constructed as described above will now be explained.

When a body part of a user (i.e., fingers, etc.) touches the touch unit (TS) of the glass plate 1, the total capacitance by adding a capacitance of the glass plate 1 and a capacitance of the user's body is inputted to an input terminal of a drive circuit unit (not shown) of the touch switching apparatus.

In detail, as the current generated by the total capacitance is applied through the conductive rubber 4 and the pin plug 5 to the drive circuit unit of the PCB 2, the drive circuit unit is operated and an LED of the touch unit emits light to the corresponding touch unit for a predetermined time period.

Accordingly, the user can recognize whether the touch unit touched by him or her has been operated or not.

However, the conventional touch switching apparatus using the LED 6 as a backlight has many problems.

For example, first, it fails to evenly illuminate light emitted by the LED 6 to a mark (for example, a symbol or a character) expressed at the touch unit of the glass plate 1.

That is, the touch unit with a symbol or a character is bright at its middle portion and is gradually darkened as it comes to its marginal portions of upper and lower and left and right sides, causing a problem that the operation state is not clearly shown.

Secondly, the light emitted from the LED 6 being operated illuminates also adjacent touch units (i.e., a symbol or a character) as well as the corresponding touch unit (i.e., a symbol or a character).

That is, since the glass plate 1 and the PCB 2 are distanced each other, the light emitted from one LED being operated also illuminates other touch units.

As a solution to the problem, the touch switching apparatus may be designed such that the touch units are formed to be so distant enough that one LED being operated may not affect other touch units or such that a light guide (or a light blocking unit) is installed to enable the light emitted from the LED to illuminate only its corresponding touch unit (i.e., a character or a symbol). In such a case, however, another problem arises that the touch switching apparatus is increased in size larger than that of the conventional ones.

Thirdly, since it uses the LED 6 as a backlight, the sizable LED 6 is to be installed standing upright on the PDB 2. In addition, since the conductive rubber is to be installed connected with the PCB 2 by using a pin plug, the touch switching apparatus is thick and sizable.

SUMMARY OF THE INVENTION

Therefore, an object of the present invention is to provide a touch switching apparatus that is capable of clearly displaying a mark drawn on a touch unit when operated by a user.

Another object of the present invention is to provide a touch switching apparatus that is capable of clearly displaying a mark drawn on the touch unit by evenly illuminating on the touch unit.

Still another object of the present invention is to provide a thin touch switching apparatus.

Yet another object of the present invention is to provide a touch switching apparatus using a flat light emitting device as a backlight.

Still yet another object of the present invention is to provide a touch switching apparatus using a thin flat light emitting device as a backlight.

To achieve these and other advantages and in accordance with the purpose of the present invention, as embodied and broadly described herein, there is provided a touch switching apparatus including: a switching unit for evenly illuminating on a touch unit manipulated by a user among touch units with marks; and a driving circuit for driving the switching unit when detecting the manipulation.

To achieve the above objects, there is also provided a touch switching apparatus including: an insulating unit for inducing a capacitance as a user's body contacts and presented with a touch switch for manipulation of an instrument; a conductive unit for detecting a capacitance through the medium (dielectric) of a user's body contacting the insulating unit; a flat light emitting device for providing a backlight to the insulating unit to visibly express a corresponding switching unit when a body contact is detected by the conductive unit; and a drive unit for detecting whether a switch has been manipulated according to a change in a capacitance made by the conductive unit;

To achieve the above objects, there is also provided a touch switching apparatus including a glass plate to which a capacitance is guided by being contacted with the body of a user, having a touch unit for instrument manipulation presented at the outer surface and a conductive plated film formed on the inner surface corresponding to the touch unit; an EL sheet operated by user's manipulation, for illuminating light on the touch unit; a conductive rubber for detecting a change in a capacitance through the medium of a user's body when the user's body contacts the touch unit from a position corresponding to the touch unit; and a printed circuit board for detecting a change in a capacitance of the body contacted with the touch unit through the conductive rubber and determining whether the touch unit has been manipulated.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIGS. 5A through 5C show operational waveforms of the touch switching apparatus using an EL sheet as a backlight in accordance with the preferred embodiment of the present invention;

FIG. 6 shows a wave form for explaining a method for setting an optimum operation level of the touch switching apparatus in accordance with the preferred embodiment of the present invention.

DETAILED DESCRIPTION OF THE PREFERRED EMBODIMENTS

Reference will now be made in detail to the preferred embodiments of the present invention, examples of which are illustrated in the accompanying drawings.

Figure 1:
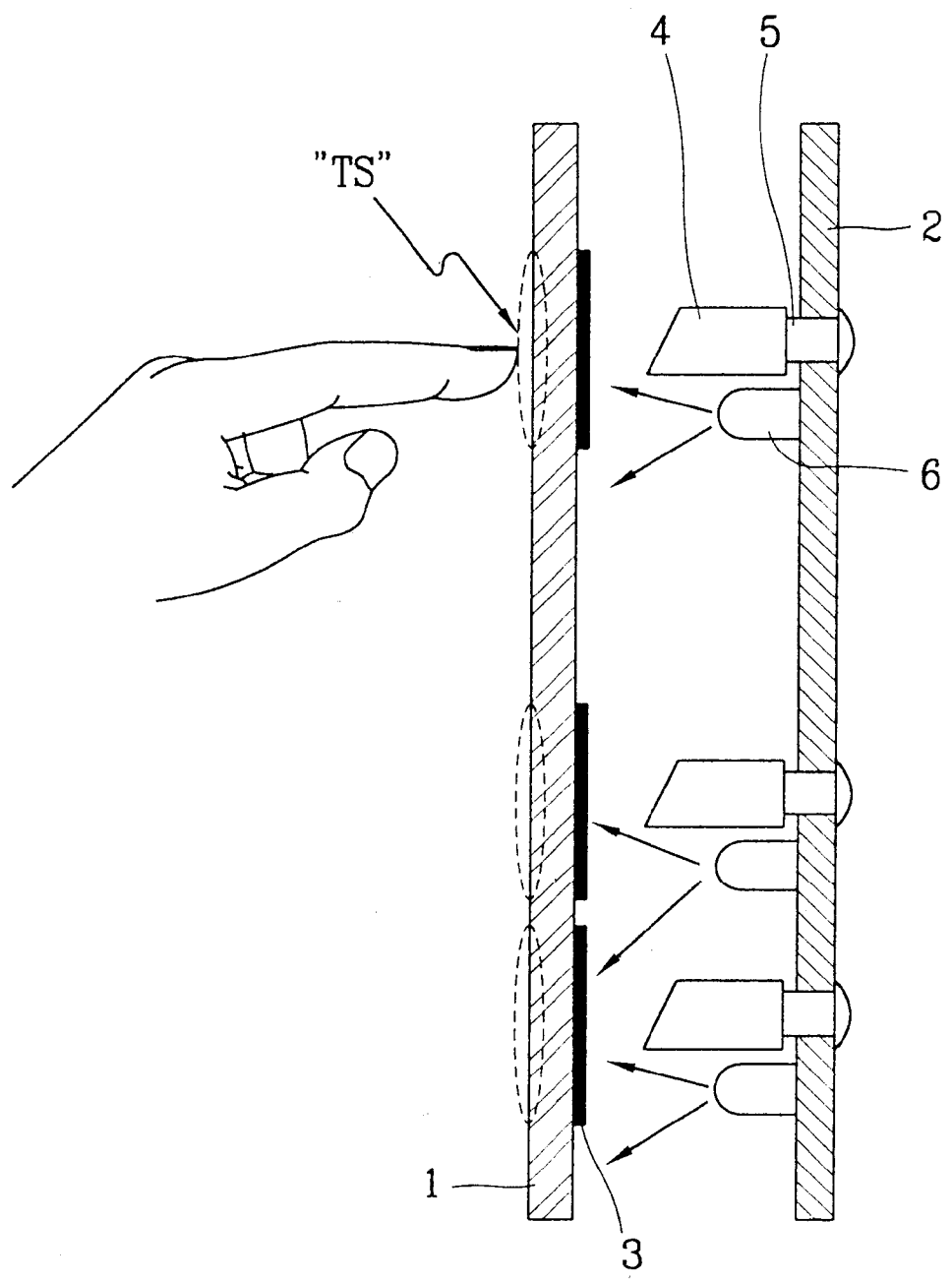
FIG. 1 is a sectional view of a touch switching apparatus using an LED as a backlight in accordance with a conventional art.
Figure 2:
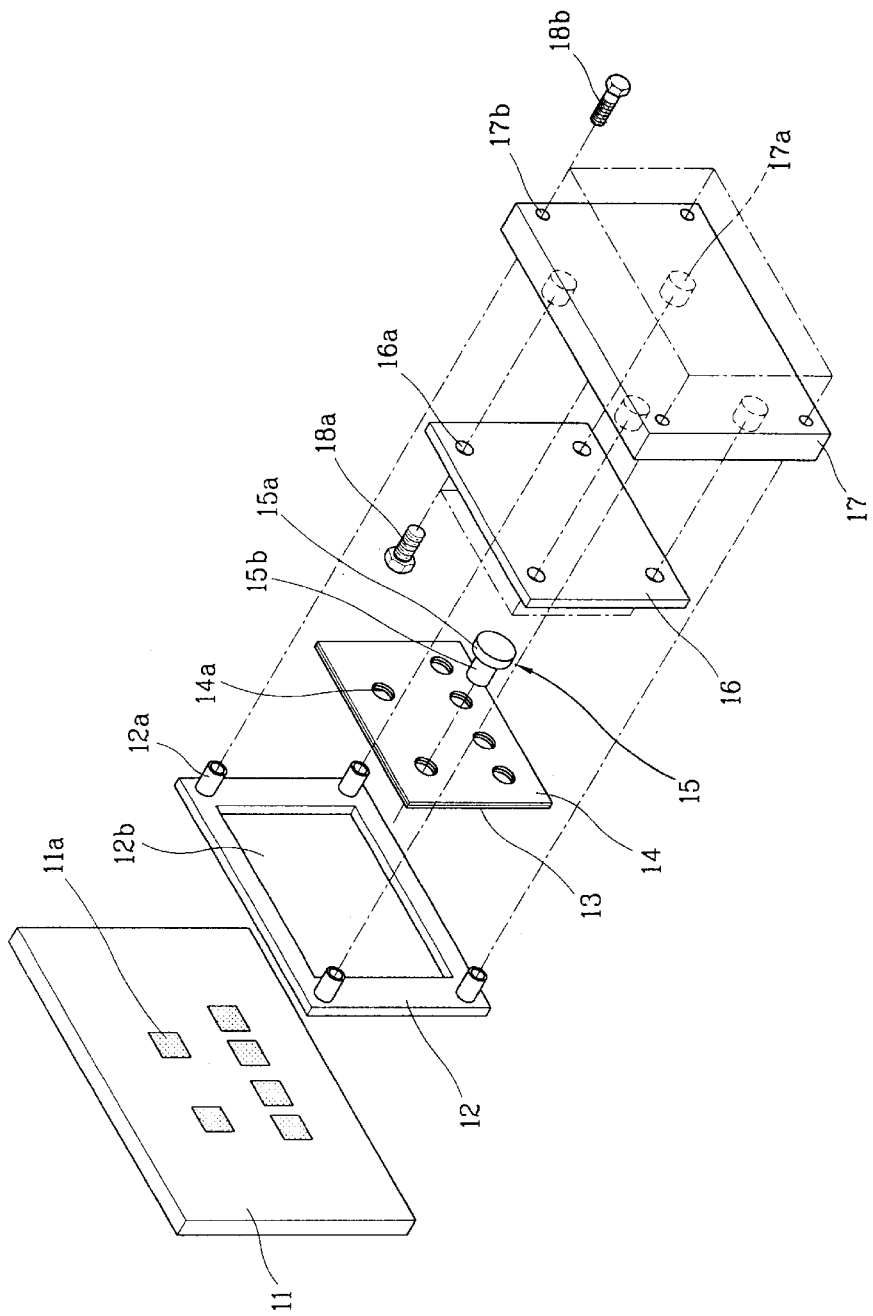
FIG. 2 is an exploded perspective view of a touch switching apparatus using an electroluminescent (EL) sheet as a backlight in accordance with a preferred embodiment of the present invention.
Figure 3:
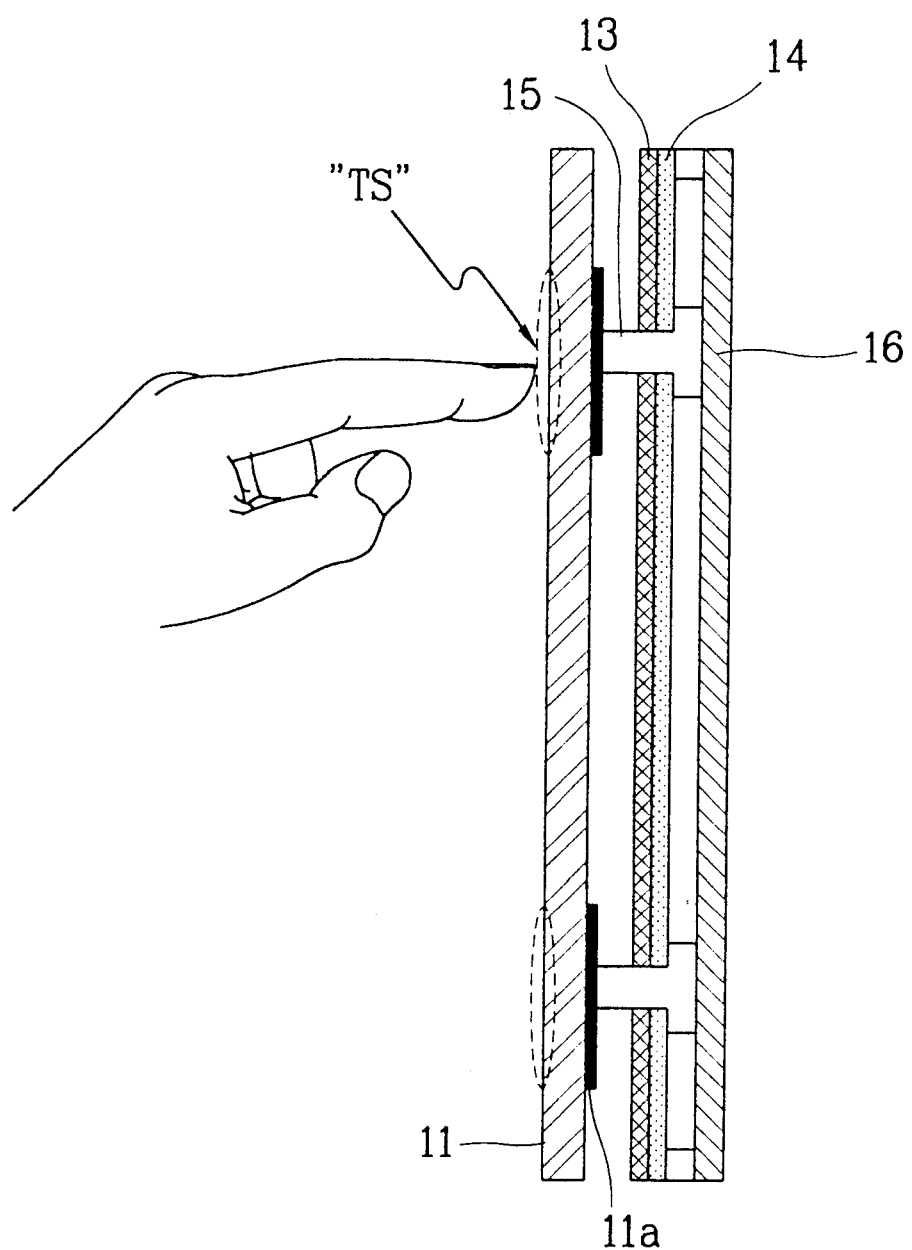
FIG. 3 is an assembled sectional view of the touch switching apparatus using an EL sheet as a backlight in accordance with the preferred embodiment of the present invention.

FIG. 2 is an exploded perspective view of a touch switching apparatus using an electroluminescent (EL) sheet as a backlight in accordance with a preferred embodiment of the present invention, and FIG. 3 is an assembled sectional view of the touch switching apparatus using an EL sheet as a backlight in accordance with the preferred embodiment of the present invention.

As shown in FIGS. 2 and 3, the touch switching apparatus using an EL sheet as a backlight of the present invention includes a glass plate 11 operable as a body party of a user contacts therewith; touch units (TS) arranged at predetermined positions; silver-plated films 11a formed partially on the inner surface or of the glass plate 11 or the opposite surface of the touch units (TS) corresponding to the touch units; plated with silver corresponding to the touch unit (TS), a switch bracket 12 attached on the glass plate 11a, having an EL window 12b; an EL sheet 13 for illuminating light on the touch units (TS); a nonconductive rubber plate 14 on which the EL sheet 13 is attached, having predetermined holes 14a; a conductive rubber 15 penetratingly inserted into the holes 14a to electrically connect a drive circuit unit and the touch units (TS); a printed circuit board (PCB) 16 on which the nonconductive rubber plate 14 with the EL sheet attached thereon is attached, having the drive circuit unit, and a PCB bracket 17 for fixing the PCB 16, the EL sheet 13, the nonconductive rubber plate 14 and the PCB 16 to the switch bracket 12.

The PCB 16 includes the drive circuit unit arranged to drive the EL sheet 13 which indicates an operation state of the touch unit.

The assembly process of each component of the touch switching apparatus constructed as described will now be explained.

The EL sheet 13 is adhered to the nonconductive rubber plate 14 by a double-sided adhesive tape, so as to be fixed to the nonconductive rubber plate 14.

The nonconductive rubber plate 14 includes holes 14a formed at positions corresponding to each switch of the copper laminated sheet of the PCB 16.

Through the hole 14a, the head portion 15b of the conductive rubber 15 contacts the PCB 16 and the end portion 15a of the conductive rubber (a bolt shape) 15 is directed to the silver-plated film 11a of the glass plate 11, so that they are accurately positioned at the glass plate 11 and each switch of the copper laminated sheet of the PCB 16.

The PCB 16 includes screw holes 16a is engaged with the PCB bracket 17 by using a screw 18a and a boss 17a penetrating the screw hole 16a.

The PCT bracket 17 having a screw hole 17b is engaged with the switch bracket 12 by using a screw 19a and a boss 12a penetrating a screw hole 17b As for the touch switching apparatus in accordance with the preferred embodiment of the present invention, when a body part of the user contacts the touch unit (TS) of the glass plate 11, the capacitance of the glass plate 11 and the user's capacitance are added to be changed to the total capacitance, according to which current flows from the glass plate 11 through the conductive rubber 15 to the drive circuit unit formed at the PCB 16, thereby indicating the operation state of the touch unit.

This operation will now be explained in detail.

Figure 4A:
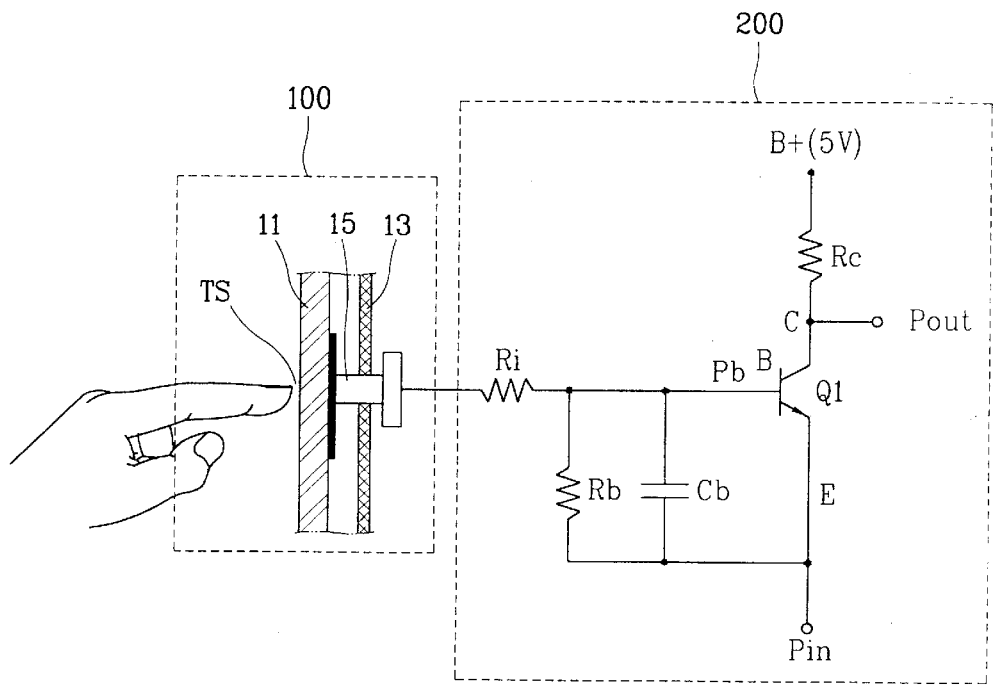
FIG. 4A is a schematic circuit diagram of the touch switching apparatus using an EL sheet as a backlight.

FIG. 4A is a schematic circuit diagram of the touch switching apparatus using an EL sheet as a backlight, which includes a switching unit 100 which contacts a body part (i.e., fingers, etc.) of the user and a drive circuit unit 200 for indicating the operation state of the switching unit 100 by detecting a signal outputted from the switching unit 100.

The switching unit 100 refers to a physical portion without the PCB 16 of FIG. 2 or 3, and the driving circuit 200 refers to circuits arranged on the PCB 16

The drive circuit unit 200 includes a controller (not shown) for controlling the operation of the switching unit 100 and a switching unit driving circuit part (not shown) for operating the switching unit 100 under the control of the controller, which, however, are general circuits and thus descriptions thereof are omitted.

Figure 4B:
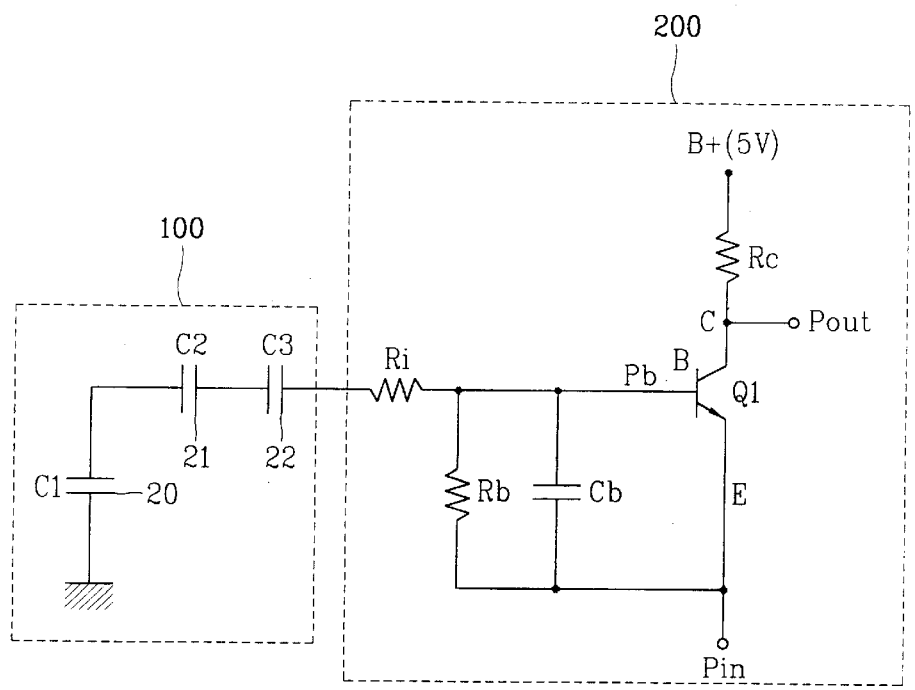
FIG. 4B is a schematic circuit diagram equivalent to that of FIG. 4 in accordance with the preferred embodiment of the present invention.

FIG. 4B is a schematic circuit diagram equivalent to that of FIG. 4 in accordance with the preferred embodiment of the present invention.

In this circuit, a switching unit 100 includes a capacitor 20 having a capacitance C1 corresponding to the user's body contacting the touch unit TS of the glass plate 11, a capacitor 21 having a capacitance C2 corresponding to the glass plate 11 and a capacitor 22 having a capacitance C3 corresponding to the EL sheet 13.

The capacitance C1 is a value obtained when the user's body contacts the touch unit TS, because the user's body serves as a medium (dielectric).

A driving circuit unit 200 includes a resistor (Ri) of an input terminal, a switching transistor Q1 for detecting whether a switch has been manipulated on the basis of a change in a capacitance detected through the resistor Ri, a base bias resistor Rb of the switching transistor Q1, a bias resistor Rc of a collector, and a charging and discharging capacitor Cb connected to the base and an emitter of the transistor Q1.

The operation of the touch switching apparatus using a flat light emitting device sheet as a backlight constructed as described above will now be explained.

FIGS. 5A through 5C show operational waveforms of the touch switching apparatus using an EL sheet as a backlight in accordance with the preferred embodiment of the present invention;

First, as shown in FIG. 5A, when a pulse signal Pin of a predetermined level (i.e., 5V, etc.) is inputted to the emitter (E) of the transistor Q1 and the user contacts the touch unit, the capacitors C1, C2 and C3 connected in series to the input terminal is charged at the positive edge like the pulse signal Pb as shown in FIG. 5B and a current according to the total capacitance (CT=C1+C2+C3) as charged is inputted to the base 'B' of the transistor Q1, and then the current charged in the capacitors C1, C2 and C3 of the input terminal of the base is discharged through the input resistor Ri at a negative edge, thereby operating the transistor Q1.

Then, as shown in FIG. 6C, an output pulse Pout is outputted from the collector of the transistor Q1.

Accordingly, according to the touch switching apparatus of the present invention, when the output pulse signal Pout is lower than the level of the pre-set operation voltage (Vref), it indicates that the operation state of the touch unit is ON.

The output waveform Pout of the transistor Q1 is the same as shown in FIG. 5C because of the capacitance C2 of the glass plate 11 and the capacitance C3 of the EL sheet 13 in the atmospheric state (or noncontacting state)

Thus, even through the output pulse wave form is different to the level of the output pulse wave form generated when the operation voltage obtained by adding the capacitance C3 according to the user's body is inputted, in order to detect a stable switch touch in case that the user contacts the touch unit, it is necessary to set a level range of a suitable output pulse wave form.

A method for setting a proper sensitivity of the touch unit in case that the user's body contacts the touch unit will now be described.

FIG. 6 shows a wave form for explaining a method for setting an optimum operation level of the touch switching apparatus in accordance with the preferred embodiment of the present invention.

In FIG. 6, state (ST#1) indicates an atmospheric state, of which a level of the output pulse wave form is Vs. The state (ST#2) indicates a touch state, of which level of the output pulse wave form is Vop. V2 indicates a level of the output pulse wave form outputted according to a temperature drift by the touch switching apparatus at a low temperature. V1 indicates a level of the output pulse wave form according to a temperature drift by the touch switching apparatus at a high temperature.

In the atmospheric state, when the level of the output pulse wave form lies near the levels of the output wave forms according to the temperature drifts, there is a possibility that the touch switching apparatus may not normally operated.

D1 indicates a potential difference between the output pulse wave form and a threshold voltage level in an atmospheric state, and D2 indicates a potential difference between the level of the output pulse wave form in the atmospheric state and the output pulse wave form in the touch state.

If there is a temperature drift or the capacitance C2 of the glass plate 11 and the capacitance C3 of the EL sheet 130 are great, since the capacitance C1 according to the user's body affect less the touch unit relatively (or there is small change in current), the variation width of the level D2 of the output pulse wave form is reduced.

That is, since the operation sensitivity of the touch switching apparatus is too high, the touch switching apparatus may erroneously operate. The operation sensitivity (S) is expressed by the following equation (1):

$$S \propto [Rb/(Ri+Rb)] \cdot [Cb \cdot CT \cdot dt]$$

wherein Rb indicates a resistance value of the base bias resistor, Ri indicates a resistance value of the resistor of the input terminal, Cb indicates a capacitance of the base-emitter capacitor, CT indicates an overall capacitance of the switching apparatus, and dt indicates a quantity of temperature drift.

Accordingly, the capacitance needs to be suitably adjusted so that the range of the level of the output pulse wave form comes within the range of D0.

That is, as shown in FIG. 6, since the operation sensitivity (S) is in proportion to the whole capacitance (CT=C1+C2+C3), the capacitance C3 of the EL sheet should be small. In order to reduce the capacitance C3, the glass plate 11 and the EL sheet 13 should be appropriately distanced.

That is, regardless of existence or nonexistence of the EL sheet 13, the distance between the EL sheet 13 and the glass plate 11 should be suitably controlled in so far as the capacitance CT is not changed. In the touch switching apparatus using the EL sheet as a backlight, the interval between the glass plate 11 and the EL sheet is maintained at 5~11 mm.

Since the touch switching apparatus using a flat light emitting device as a backlight uses the EL sheet 13 as a backlight of the touch switch, the brightness of the light is even compared to the conventional touch switching apparatus using the light emitting diode as a backlight.

That is, since the EL sheet 13 emits light on the plane, according to the characteristics of the EL sheet, the uniformity of the brightness of the light can be obtained by more than 99%. This contributes to present the switching manipulation state (a mark illumination such as a symbol or a character) with the constantly even brightness regardless of the area shown by being emitted in manipulation of the touch switch.

As so far described, the touch switching apparatus of the present invention has many advantages.

For example, first, since it uses a flat light emitting device such as the EL sheet as a backlight, only the touch unit manipulated by the user is illuminated with the even brightness, and accordingly, the user can easily recognize the mark (i.e., a symbol or a character) drawn at the touch unit.

Secondly, since it uses the flat light emitting device such as the EL sheet as a backlight, only the corresponding touch unit is Illuminated and the illumination does not leaked to an adjacent touch unit.

Thirdly, since the flat light emitting device such as the EL sheet as a backlight, the nonconductive rubber plate and the conductive rubber are used to form a conductive unit of the PCB against the glass plate, the switching unit can be implemented to be thin.

Though the touch switching apparatus of the present invention implements the switching unit by using the flat light emitting device such as the EL sheet which is able to illuminate evenly, different embodiments of the present invention may be implemented by using various different illumination equipment which may illuminate on the touch unit evenly.

In addition, as for each component of the touch switching apparatus, the attachment according to the both-sided tape, the engagement of the screw and the form of the screws are considered one embodiment, and various modification may be made in the method in which component are integrated and arranged at the right place as implemented in the preferred embodiment of the present invention.

For example, there may be various modifications to the characteristics that the EL sheet is arranged between the glass plate and the PCB, and the light emitted from the EL sheet has a function of informing the user of the switch manipulation state through the glass plate and that when the capacitance of the user who touches the glass plate is changed, the conductive unit (a conductive structure including nonconductive rubber plate and conductive rubber) is included to detect whether the switch has been manipulated.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the meets and bounds of the claims, or equivalence of such meets and bounds are therefore intended to be embraced by the appended claims.

What is claimed is:

1. A touch unit switching apparatus comprising:
   a switching unit for evenly illuminating a touch unit manipulated by a user among touch units with marks; and
   a driving circuit for driving the switching unit when detecting the manipulation and wherein an operational state of the touch unit is effected by a change in total capacitance and the total capacitance includes the capacitance corresponding to a user's body contacting a touch unit of a glass plate, a capacitance corresponding to a glass plate and a capacitance corresponding to an electroluminescent sheet and the total capacitance does not require a material deformation to drive the driving circuit.

2. The apparatus of claim 1, wherein the switching unit comprises:
   a dielectric having touch units and a first capacitance; and
   a flat light emitting device for evenly illuminating on the dielectric.

3. The apparatus of claim 2, wherein the dielectric includes a glass plate.

4. The apparatus of claim 2, wherein the flat light emitting device includes an electroluminescent sheet.

5. The apparatus of claim 2, wherein the flat light emitting device has a second capacitance.

6. The apparatus of claim 5, wherein the drive circuit unit is driven by a total capacitance obtained by adding a third capacitance charged in the body of a user to the sum of the first capacitance and the second capacitance.

7. The apparatus of claim 1, wherein the driving circuit unit includes switches which perform switching operations according to the manipulation of the touch units, corresponding to the number of the touch units.

8. The apparatus of claim 7, wherein the switches include transistors.

9. The apparatus of claim 8, wherein, the transistor includes an emitter to which a pulse signal having a predetermined period and level is inputted, and an output signal is outputted to its collector according to a signal inputted to its base.

10. The apparatus of claim 7, wherein the output signal is a peak wave form.

11. The apparatus of claim 7, further comprising a controller for driving the switching unit upon receipt of the output signal outputted from the switches.

12. The apparatus of claim 1, wherein the switching unit comprising:
   a glass plate for inducing a first capacitance as being contacted with a user's body, including an outer surface of the touch units and conductive plated films formed on the inner surface corresponding to the touch units;
   a flat light emitting device for evenly illuminating light on a touch unit manipulated by the user; and
   a conductive rubber for detecting a variation of a third capacitance formed in the user's body as being contacted by the user's body at the position corresponding to the touch units.

13. The apparatus of claim 12, wherein the flat light emitting device includes an electroluminescent sheet.

14. The apparatus of claim 12, wherein the flat light emitting device generates a second capacitance.

15. The apparatus of claim 14, wherein the distance between the glass plate and the flat light emitting device is as far as the second capacitance is not influenced by the flat light emitting device with respect to the capacitance in the atmospheric state (the sum value of the first capacitance and the second capacitance) and the total capacitance in the touch state (the sum value of the first, the second and the third capacitances).

16. The apparatus of claim 14, wherein the conductive rubber has a bolt type, of which a head portion contacts the switch of the copper laminated sheet of the printed circuit board and an end portion is directed to the touch unit of the glass plate, the conductive rubber serving as a conductive path for detecting whether the user has touched the touch unit.

17. The apparatus of claim 14, wherein a nonconductive rubber plate is installed between the flat light emitting device and the printed circuit board, and holes are formed on the nonconductive rubber plate and the flat EL sheet, into which the conductive rubber is penetratingly inserted.

18. The apparatus of claim 12, wherein the drive circuit unit comprises:
   a copper laminated sheet electrically connectable with the conductive rubber; and
   a printed circuit board having switches arranged for detecting a change in the capacitance of the user's body contacting the touch unit through the copper laminated sheet connected with the conductive rubber and determining whether the touch unit has been manipulated.

19. A touch switching apparatus comprising:

an insulating unit for inducing a capacitance as a user's body contacts and presented with a touch switch for manipulation of an instrument;

a conductive unit for detecting a capacitance through the medium (dielectric) of a user's body contacting the insulating unit;

a flat light emitting device for providing a backlight to the insulating unit to visibly express a corresponding switching unit when a body contact is detected by the conductive unit;

a drive unit for detecting whether a switch has been manipulated according to a change in a capacitance made by the conductive unit and a material deformation of material forming various components of the total capacitance is not required to drive the drive circuit.

20. A touch switching apparatus comprising a glass plate to which a capacitance is guided by being contacted with the body of a user, having a touch unit for instrument manipulation presented at the outer surface and a conductive plated film formed on the inner surface corresponding to the touch unit;

an EL sheet operated by user's manipulation, for illuminating light on the touch unit;

a conductive rubber for detecting a change in a capacitance through the medium of a user's body when the user's body contacts the touch unit from a position corresponding to the touch unit; and a printed circuit board for detecting a change in a capacitance of the body contacted with the touch unit through the conductive rubber and determining whether the touch unit has been manipulated and material deformation is not required to drive a drive circuit.

21. The apparatus of claim 20, wherein the conductive rubber has a bolt type, of which a head portion contacts the switch of the copper laminated sheet of the printed circuit board and an end portion is directed to the touch unit of the glass plate, the conductive rubber serving as a conductive path for detecting whether the user has touched the touch unit.

22. The apparatus of claim 20, wherein the conductive rubber is positioned at the glass plate and the switch unit of the copper laminated sheet of the printed circuit board, and a nonconductive rubber plate with a conductive hole formed for inserting the conductive rubber is farther included.

23. The apparatus of claim 22, wherein the EL sheet is fixedly attached at the nonconductive rubber plate, so that the nonconductive rubber supports the EL sheet.

24. A touch switching apparatus comprising:

a switching unit for evenly illuminating a touch unit manipulated by a user among touch units with marks; and a driving circuit for driving the switching unit when detecting the manipulation and wherein an operational state of the touch unit is effected by a change in total capacitance and the total capacitance includes a capacitance corresponding to a user's body contacting a touch unit of a glass plate, a capacitance corresponding to a glass plate and a capacitance corresponding to an electroluminescent sheet and where material deformation of material forming various components of total capacitance is not required to drive the drive unit.

25. A touch switching method comprising:

inducing a capacitance in an insulating unit upon a user's body contact with a touch switch;

detecting a capacitance in a conductive unit through the medium (dielectric) of a user's body contacting the insulating unit;

providing a backlight to the insulating unit to visibly express a corresponding switching unit when a body contact is detected by the conductive unit; and detecting in a drive unit whether a switch has been manipulated according to a change in capacitance made by the conductive unit and a material deformation of material forming various components of a total capacitance is not required to drive the drive unit.

* * * * *